US006209658B1

(12) United States Patent
Yoon

(10) Patent No.: US 6,209,658 B1
(45) Date of Patent: Apr. 3, 2001

(54) MOTORIZED SCREW DRIVING TOOL

(75) Inventor: Moo-Young Yoon, Seoul (KR)

(73) Assignee: Dong Eun Electronics Co., Ltd., Seoul (KR)

( * ) Notice: Subject to any disclaimer, the term of this patent is extended or adjusted under 35 U.S.C. 154(b) by 0 days.

(21) Appl. No.: 09/504,846

(22) Filed: Feb. 16, 2000

(51) Int. Cl.[7] .............................. B23Q 5/00; B25B 15/00
(52) U.S. Cl. ............................ 173/93.5; 173/93; 173/176
(58) Field of Search ............................ 173/93, 93.5, 117, 173/176, 217, 178, 179, 122

(56) References Cited

U.S. PATENT DOCUMENTS

| | | | | |
|---|---|---|---|---|
| 4,727,780 | | 3/1988 | Huang | 81/54 |
| 4,947,939 | * | 8/1990 | Hung | 173/93 |
| 5,412,546 | * | 5/1995 | Huang | 173/176 |
| 5,435,398 | * | 7/1995 | Juan | 173/93.5 |
| 5,740,892 | * | 4/1998 | Huang | 173/179 |
| 5,887,666 | * | 3/1999 | Chen et al. | 173/93 |
| 5,915,484 | * | 6/1999 | Hsieh | 173/93.5 |
| 5,941,319 | * | 8/1999 | Juan | 173/117 |

* cited by examiner

*Primary Examiner*—Scott A. Smith
(74) *Attorney, Agent, or Firm*—Jacobson, Price, Holman & Stern, PLLC

(57) ABSTRACT

A motorized screw driving tool including a motor adapted to generate a rotating force, an inertia wheel coupled to the motor and provided with power transmission assembly, and a spindle adapted to received power from the inertia wheel and provided with a power receiving member. The power transmission assembly includes an actuating member resiliently mounted at one side of the inertia wheel and provided at opposite sides thereof with protruded pins, a pair of guide members adapted to guide a slide movement of the actuating member and provided with guide slots receiving the protruded pins, a cylindrical support member mounted at the other side of the inertia wheel and provided at opposite sides thereof with a pair of slots, a slide member slidably fitted in the cylindrical support member, a pair of cam members pivotally connected to the slide member by a pin extending through the slide member and the slots of the cylindrical support member, and a pair of links each pivotally coupled at one end thereof to an associated one of the cam members and at the other end thereof to the associated pin of the actuating member. The power receiving member includes a lever fixedly mounted around the spindle and provided with a groove in which the slide member is engagable.

3 Claims, 7 Drawing Sheets

MOTORIZED SCREW DRIVING TOOL

BACKGROUND OF THE INVENTION

1. Field of the Invention

The present invention relates to a motorized screw driving tool adapted to rotate a screw using the driving power of a motor, and more particularly to a motorized screw driving tool used for separation or mounting of tires of a vehicle or to drive a lift jack.

2. Description of the Prior Art

As well known, great force is required to separate tires of a vehicle from a body of the vehicle or to drive a lift jack used to a vehicle off of the ground. In particular, it is difficult for women and old or weak persons to carry out the task of separation tires of a vehicle or driving a lift jack.

In order to solve such a problem, a motorized screw driving tool utilizing the inertial force of a motor has recently been proposed. A representative example is disclosed in U.S. Pat. No. 4,947,939. This patent discloses the structure of a motorized screw bolt driving tool which is illustrated in FIG. 1.

As shown in FIG. 1*a*, the motorized screw bolt driving tool of the patent includes a motor 101, and an inertia wheel mounted around a spindle coupled to the motor 101 such that it is rotated by the motor 101. Fins 102 are mounted at one side of the inertia wheel such that they are developed by a centrifugal force of the inertia wheel. Each pin 103 is connected at one end thereof to an associated one of the fins 102 by means of a link. The other end of each pin 103 protrudes from the other side of the inertia wheel. An arch shaped brake element 104 is pivotally mounted at the other side of the inertia wheel such that its pivotal movement is prevent by the protruded ends of the pins 103.

When the motor 101 rotates at a certain velocity or more, a centrifugal force capable of developing the fins 102 is generated. In this state, one of the pins 103 is retracted, so that the arch shaped brake element 104 pivots left or right, as shown in FIG. 1*b*.

Accordingly, the arch shaped brake element 104, which pivots at a high velocity, enters, at one or the other end thereof, a recess formed in the spindle and strikes the spindle on the facing left or right side surface of the recess. As a result of, the spindle turns a nut, or the like, engaged in the end thereof by a strong force caused by an impact resulting from an inertial force of the arch shaped brake element 104. Thus, a force sufficiently strong to separate a tire or to drive a lift jack is obtained.

However, the conventional motorized screw bolt driving tool has a structure in which the recess of the spindle is limited in its width. For this reason, it is difficult for the arch shaped brake element to engage in the recess at one time. Furthermore, the arch shaped brake element contacts the spindle in the recess in a point contact manner. As a result, a chattering phenomenon occurs which results in an instable starting force of the spindle.

After the arch shaped brake element and spindle recess are used for a certain period of time, they are abraded at the ends thereof. This results in an increase in the chattering phenomenon.

Moreover, the conventional motorized screw bolt driving tool has a structure in which the distance A between the centers of the arch shaped brake element and spindle is short, as shown in FIG. 2. Since a power transmission is carried out with such a short distance, a chattering phenomenon occurs which prevents an effective transmission of the inertial force generated by the inertia wheel.

SUMMARY OF THE INVENTION

Therefore, a first object of the invention is to provide a motorized screw driving tool having a structure including a spindle and an inertial wheel mounted around the spindle, in which an inertial force generated by the inertia wheel is applied to the spindle at a position spaced apart from the center of the spindle by a large distance, thereby obtaining a high starting force.

A second object of the invention is to provide a motorized screw driving tool having a structure including a spindle and an inertia wheel mounted around the spindle, in which a power transmission member mounted to the inertia wheel and adapted to transmit power to the spindle has a greatly large engagement angle, thereby avoiding a chattering phenomenon of a starting force generated upon its initial power transmission.

A third object of the invention is to provide a motorized screw driving tool having a structure including a spindle and an inertia wheel mounted around the spindle, in which a power transmission member mounted to the spindle are in contact with each other in a round surface contact manner, thereby obtaining a durability.

In order to accomplish these objects, the present invention provides a motorized screw driving tool including a motor provided with a splined rotating shaft and adapted to generate a rotating force, an inertia wheel coupled to the rotating shaft of the motor and provided with power transmission means, and a spindle adapted to receive power receiving means, wherein: the power transmission means comprises: an actuating member resiliently mounted at one side of the inertia wheel by a spring and provided at opposite sides thereof with protruded pins, respectively, a pair of guide members adapted to guide a slide members having a guide slot receiving an associated one of the protruded pins of the actuating member, a cylindrical support member mounted at the other side of the inertia wheel and provided at opposite sides thereof with a pair of slots, respectively, a slide member slidably fitted in the cylindrical support member, a pair of cam members pivotally connected to the slide member and the slots of the cylindrical support member, and a pair of links each pivotally coupled at one end thereof to an associated one of the cam members by a pin and at the other end thereof to the associated pin of the actuating member, the links serving to link the cam members to the actuating member; and the power receiving means comprises a lever fixedly mounted around the spindle and provided with a groove with which the slide member can engage.

In accordance with the present invention, the inertial force from the inertia wheel is applied to the spindle at a position spaced apart from the center of the spindle by a very large distance. Accordingly, it is possible to obtain a strong starting force. Also, there is no or little chattering phenomenon generated during the power transmission by virtue of the guide function of the head having an inclined surface. Therefore, a stable starting force is generated. In particular, there is no element being abraded during the power transmission operation. Accordingly, there is an advantage in that a high durability is obtained which results in a lengthened use life.

BRIEF DESCRIPTION OF THE DRAWINGS

Other objects and aspects of the invention will become apparent from the following description of embodiments with reference to the accompanying drawings in which:

FIGS. 1*a* and 1*b* are views illustrating the construction and operation of a conventional motorized screw driving tool, wherein FIG. 1*a* is a side view, and FIG. 1*b* is a front view;

FIGS. 5*a* and 5*b* are views illustration the operation of the motorized screw driving tool according to the present invention, wherein FIG. 5*a* shows a state prior to the operation, and FIG. 5*b* shows a normal operation state for transmitting a starting force;

DESCRIPTION OF THE PREFERRED EMBODIMENTS

Figure 1A:
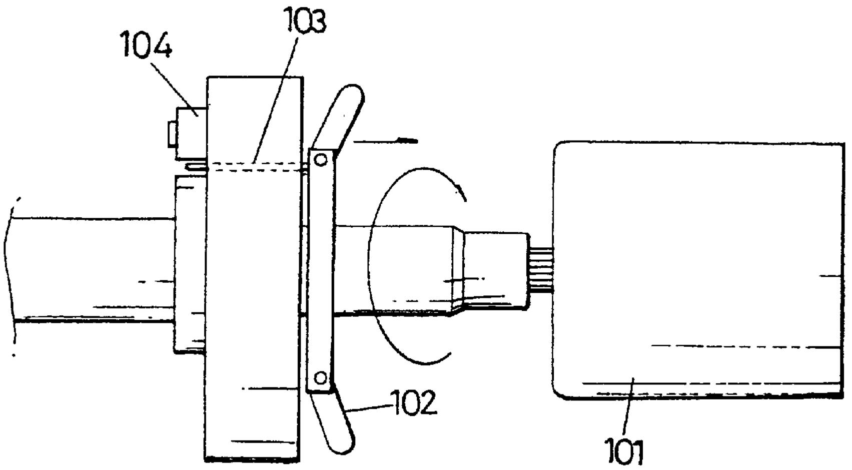
Figure 1B:
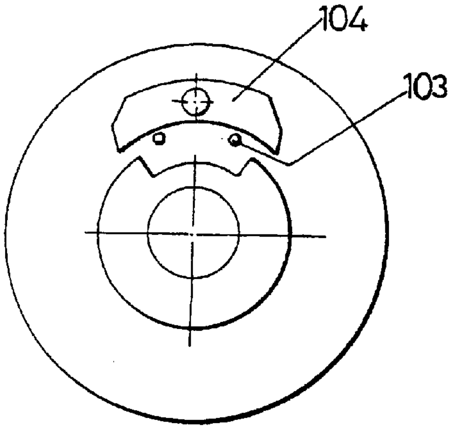
Figure 2:
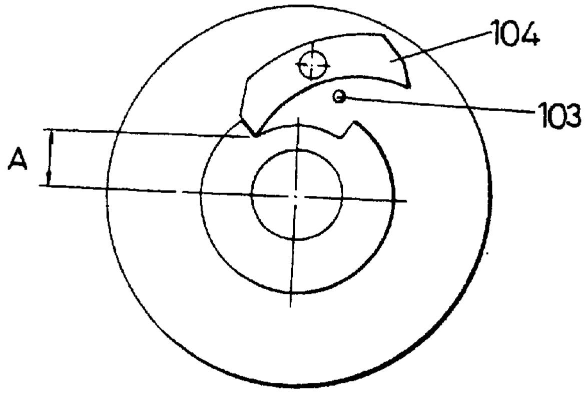
FIG. 2 is a front view illustrating the operation of the conventional motorized screw driving tool.
Figure 3:
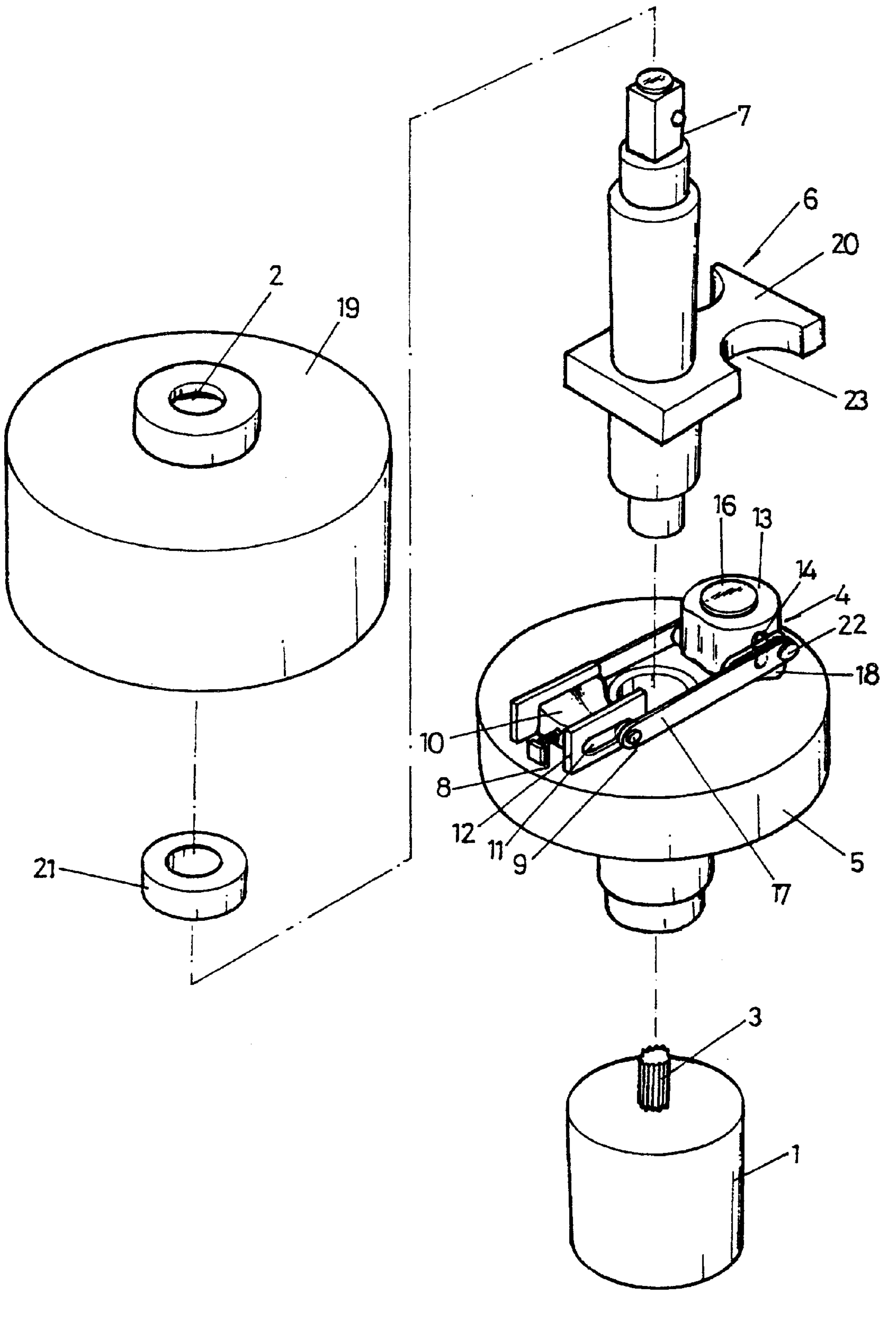
FIG. 3 is an exploded perspective view illustrating a motorized screw driving tool according to the present invention.
Figure 4:
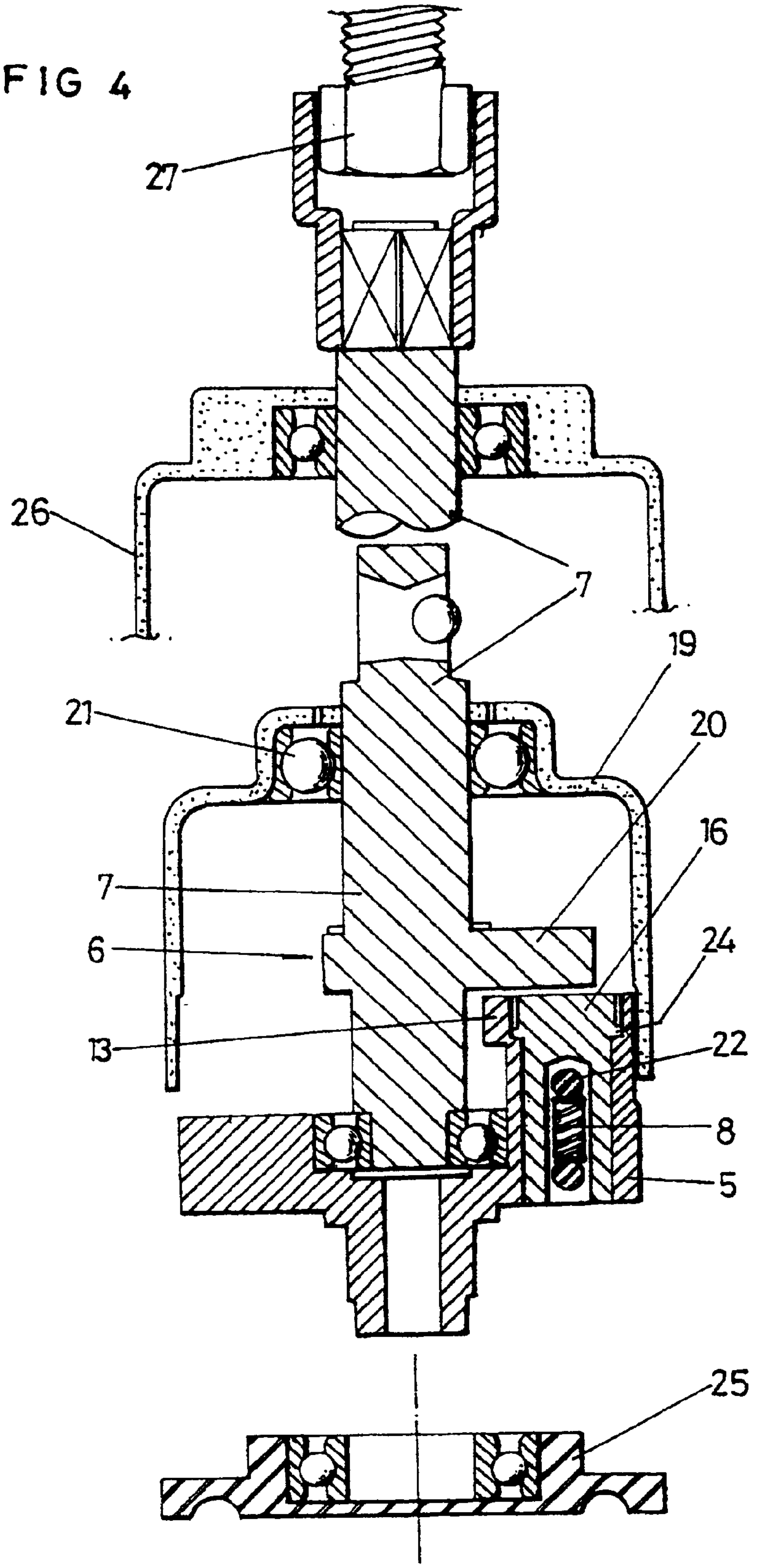
FIG. 4 is a sectional view illustrating the motorized screw driving tool according to the present invention in an assembled state.

Referring to FIG. 3, a motorized screw driving tool according to the present invention is illustrated.

As shown in FIG. 3, the motorized screw driving tool of the present invention includes a motor 1 provided with a splined rotating shaft 3 and adapted to generate a rotating force, an inertia wheel 5 coupled to the rotating shaft 3 of the motor 1 and provided with a power transmission assembly 4, and a spindle 7 adapted to receiving member 6. This construction is similar to that in conventional motorized screw driving tools.

In accordance with the present invention, the power transmission assembly 4 includes an actuating member 10 resiliently mounted at one side of the inertia wheel 5 by means of a spring 8. The actuating member 10 is provided at opposite sides thereof with protruded pins 9, respectively. The power transmission assembly 4 also includes a pair of guide members 12 adapted to guide a slide movement of the actuating member 10. Each guide member 12 has a guide slot 11 receiving an associated one of the protruded pins 9 of the actuating member 10. The power transmission assembly 4 further includes a cylindrical support member 13 mounted at the other side of the inertia wheel 5 and provided at opposite sides thereof with a pair of slots 14, respectively. A slide member 16 is slidably fitted in the cylindrical support member 13. The slide member 16 is provided at its outer end with a head 15 having a truncated conical surface with a diameter increasing toward its outer end. The power transmission assembly 4 further includes a pair of cam members 18 pivotally connected to the slide member 16 by means of a pin 22 extending through the slide member 16 and slots 14. A link 17 is pivotally coupled at one end thereof to each cam member 18 by means of a pin 22 and at the other end thereof to the actuating member 10 by means of the associated in 9. That is, the cam members 18 are linked to the actuating member 10 by the links 17.

In accordance with the present invention, the power receiving member 6 has a lever 20 fixedly mounted around the spindle 7. The lever 20 has a semicircular groove 23 for receiving the head 15 of the slide member 16.

A U-shaped rotating cover 19 is rotatably mounted around the spindle 7. The rotating cover 19 has a central hole 2 for receiving the spindle 7.

In FIGS. 3 to 9, the reference numeral 21 denotes a bearing, 25 an inertia wheel bearing case, 26 an adapter, and 27 an object, such as a blot, to be rotated by the motorized screw driving tool.

Now, the operation of the motorized screw driving tool according to the present invention will be described.

When the motor 1 rotates, the inertia wheel 5 coupled to the splined rotating shaft 3 of the motor 1 rotates. As the rotation of the motor 1 is continued, the rotating velocity of the inertia wheel 5 increases. When the rotating velocity of the inertia wheel 5 reaches a certain value, the actuating member 10 mounted at one side of the inertia wheel 5 moves outwardly from the state of FIG. 5*a* to the state of FIG. 5*b* against the resilience of the spring 8 by a centrifugal force generated by the rotation of the inertia wheel. At this time, the movement of the actuating member 10 is guided by its protruded pins 9 received in the guide slots 11.

As a result, the links 17 move away from the cylindrical support member 13, so that they pull the cam members 18 in the same direction. Accordingly, each cam member 18 pivots about the pin 22 and comes into contact with the surface of the inertia wheel. Once the cam member 18 comes into contact with the surface of the inertia wheel 5, a further movement of the associated link 17 causes the cam member 18 to slide along the associated slot 14, as shown in FIG. 5*b*. Consequently, the cam member 18 moves the slide member 16 in a right direction when viewed in FIG. 5*b*.

Figure 5A:
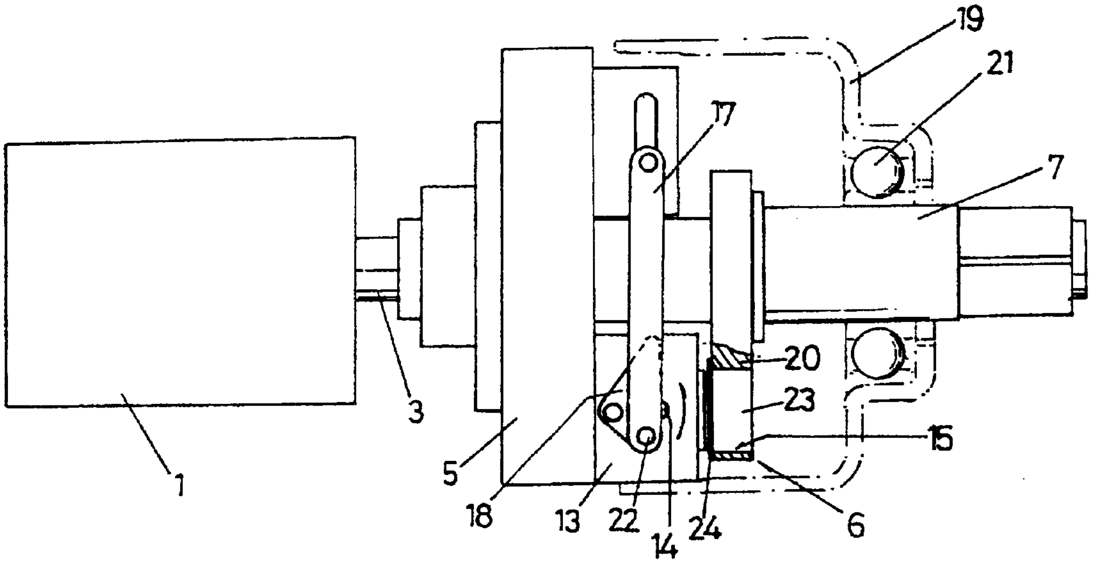
Figure 5B:
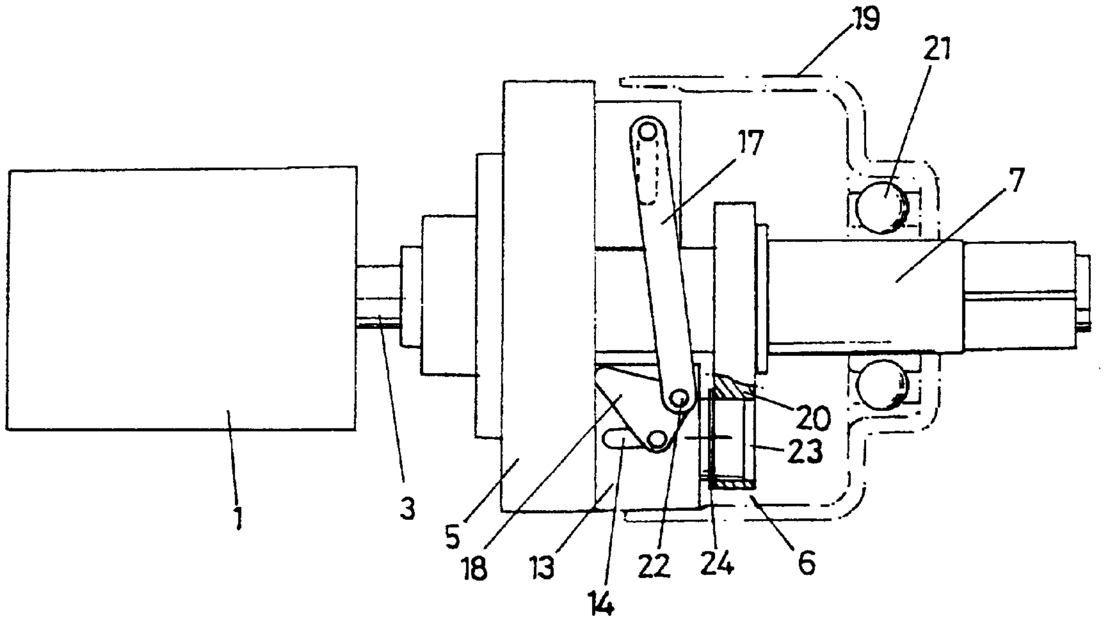
Figure 6:
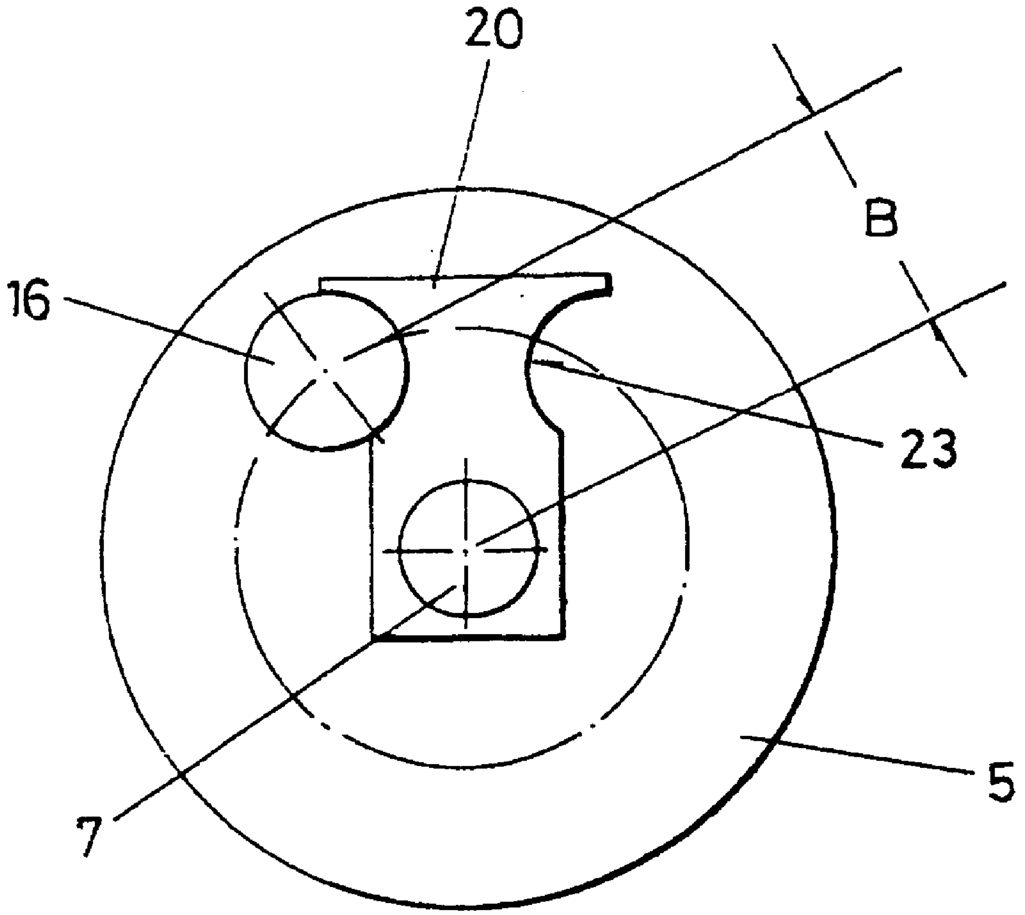
FIG. 6 is a front view illustration the operation of the motorized screw driving tool according to the present invention.

Accordingly, the head 15 of the slide member 16, which rotates at a high velocity together with the inertia wheel 5, strikes the lever 20 constituting the power receiving member 6 while coming into contact with the groove 23 of the level 20, as shown in FIGS. 5*b* and 6.

As a result, the lever 20 receives an inertial force from the slide member 16, thereby rotating the spindle 7 with a strong force. In accordance with the present invention, the inertia force from the inertia wheel 5 is applied to the spindle by a distance much larger than that in the conventional construction. Accordingly, it is possible to obtain strong starting force.

Thus, it is possible to effectively rotate an object, such s a bolt or nut, to be rotated, which is engaged with the spindle 7. Once the power from the tool is transmitted to the object, the RPM of the inertia wheel 5 decreases abruptly.

As a result, the centrifugal force applied to the actuating member 10 disappears, thereby causing the actuating member 10 to return to its original position shown in FIG. 5*a* by virtue of the resilience of the spring 8. This also causes the cam member 18 to return to its original position, so that the slide member 16 returns rapidly to its original position by virtue of the resilience of the spring 8. Thus, the power transmission assembly 4 returns to a state prior to its operation. In this state, the motor 1 is in as idle state corresponding to its initial state, so that it an rotate again the inertia wheel 5 at a high velocity.

Since the slide member 16 transmits a strong starting force to the spindle 7 under the condition in which its head 15 engages stably with lever 20 of the spindle 7, it is possible to apply a strong force along with a strong impact to the object. Accordingly, even a nut, which is tarnished or attached with foreign matters, thereby making its rotation difficult, can be easily rotated. Thus, the motorized screw driving tool of the present invention makes it possible to easily release tire fixing bolts or to easily drive a lift jack.

In accordance with the present invention, the power transmission point, at which the inertial force from the inertia wheel 5 is transmitted to the spindle 7, is spaced apart from the center of the spin 7 by a maximum distance B, as shown in FIG. 6. Accordingly, it is possible to transmit a strong starting force to the spindle 7. In particular, the slide member 16 engages with the groove 23 of the lever 20 immediately after it protrudes from the cylindrical support member 13. Thus, a rapid and stable transmission of the inertial force is achieved.

Meanwhile, the motorized screw driving tool of the present invention can be used as a tool for separating a tire from a vehicle body or coupling the tire to the vehicle body. In this case, a socket engagable with a tire fixing nut is mounted to the end of the spindle 7. Where a worm gear box is attached to the end of the spindle 7 while being connected to a lift jack, the motorized screw driving tool can be used as a tool for driving the lift jack. The motorized screw driving tool may also be widely used in other appropriate applications.

In accordance with the present invention, a stopper 24 may be provided at the slide member 16. The stopper 24 is positioned beneath the head 15 of the slide member 16 and adapted to prevent an excessive protrusion of the slide member 16 from the cylindrical support member 13 beyond the state of FIG. 5*b* so as to obtain a stable operation of the slide member 16.

Figure 7:
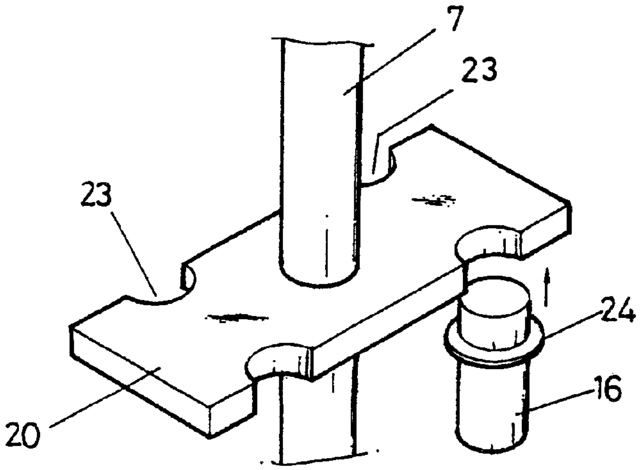
FIGS. 7 and 8 are views illustrating other embodiments of the present invention.
Figure 8:
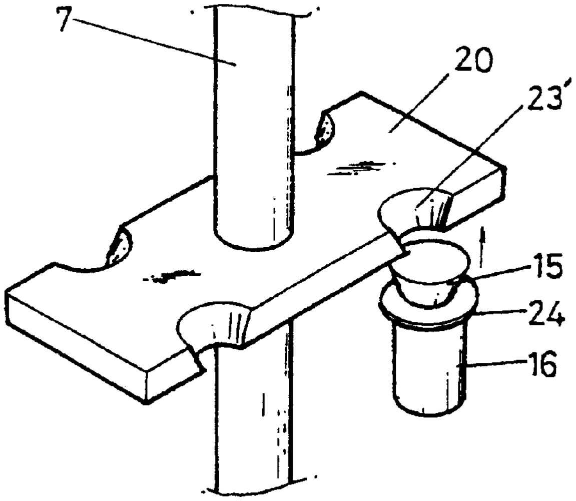
Figure 9:
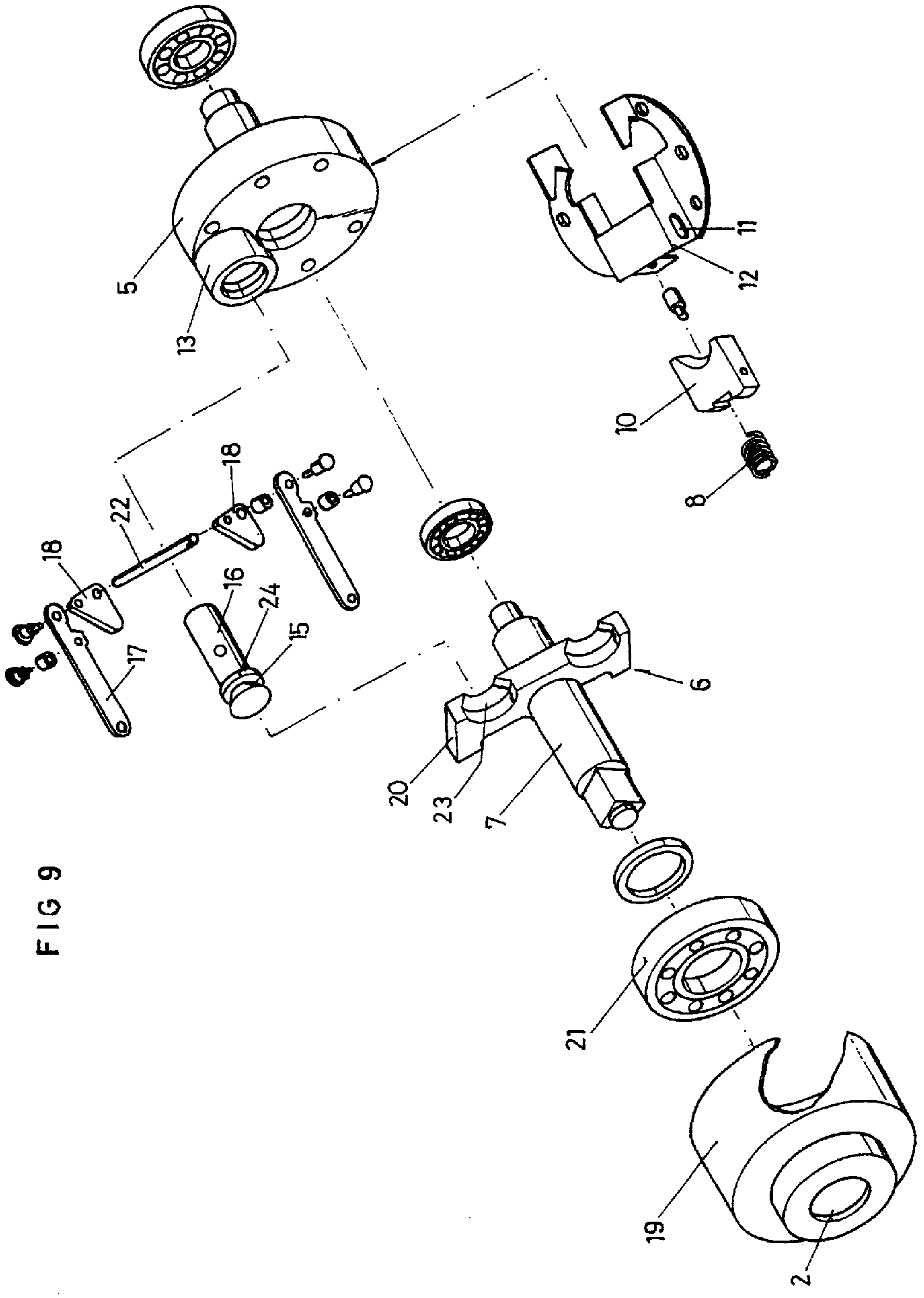
FIG. 9 is an exploded perspective view illustrating the construction according to the embodiments of the present invention shown n FIGS. 7 and 8.

In FIGS. 7 and 8, other embodiments of the present invention are illustrated, respectively. According to this construction, the lever 20 is provided with a plurality of grooves 23 at opposite sides thereof in order to increase the number of times for the slide member 16 to transmit power to the spindle 7. In these constructions, accordingly, it is possible to reduce a starting torque transmitted by the slide member 16.

In particular, in the embodiment of FIG. 8, the lever 20 has grooves 23' each having an inclined surface. In this case, the head 15 of the slide member 16 can maintain a stable engagement state with one of the grooves 23'. Accordingly, it is possible to completely prevent the generation of a chattering phenomenon. This results in an accomplishment of an efficient starting of the spindle.

As apparent from the above description, the present invention provides a motorized screw driving tool having a structure capable of the motor 1 to the spindle 7, thereby obtaining a strong starting force. In accordance with the present invention, the lever 20 has a structure extending from the spindle 7 at one side or opposite sides, of the spindle 7. Accordingly, it is possible to adjust the number of times for the lever 20 to come into contact with the slide member 16, thereby appropriately adjusting the matching of the number of power transmission times and starting torque. Also, there is no or little chattering phenomenon generated during the power transmission by virtue of the guide function of the head 15 having an inclined surface. Therefore, a stable starting force is generated. In particular, there is no element being abraded during the power transmission operation. Accordingly, there is an advantage in that a high durability is obtained which results in a lengthened use life.

Although the preferred embodiments of the invention have been disclosed for illustrative purposes, those skilled in the art will appreciate that various modifications, additions and substitution are possible, without departing from the scope and spirit of the invention as disclosed in the accompanying claims.

What is claimed is:

1. A motorized screw driving tool including a motor provide with a splined rotating shaft and adapted to generate a rotating force, an inertia wheel coupled to the rotating shaft of the motor and provided with power transmission means, and a spindle adapted to receive power from the inertia wheel and provided with a power receiving means, wherein:

the power transmission means comprises:

an actuating member resiliently mounted at one side of the inertia wheel by a spring and provided at opposite sides thereof with protruded pins, respectively, a pair of guide members adapted to guide a slide movement of the actuating member, each of the guide members having a guide slot receiving an associated one of the protruded pins of the actuating member, a cylindrical support member mounted at the other side of the inertia wheel and provided at opposite sides thereof with a pair of slots, respectively, a slide member slidably fitted in the cylindrical support member, a pair of cam members pivotally connected to the slide member by a pin extending through the slide member and the slots of the cylindrical support member, and a pair of links each pivotally coupled at one end thereof to an associated one of the cam members by a pin and at the other end thereof to the associated pin of the actuation member, the links serving to link the cam members to the actuating member; and the power receiving means comprises a lever fixedly mounted around the spindle and provided with a groove in which the slide member is engagable.

2. The motorized screw driving tool according to claim 1, wherein the lever has opposite side portions respectively extending form the spindle at opposite sides of the spindle.

3. The motorized screw driving tool according to claim 1, wherein the slide member of the power transmission means is provided at an outer end thereof with a head having a truncated conical surface with a diameter increasing toward its outer end, and the groove of the lever has a semicircular shape and an inclined surface having the same inclination as that of the truncated conical surface of the slide member.

* * * * *